July 30, 1957 C. S. BURTCHAELL 2,800,984
LUGGAGE HANDLE
Filed May 2, 1955
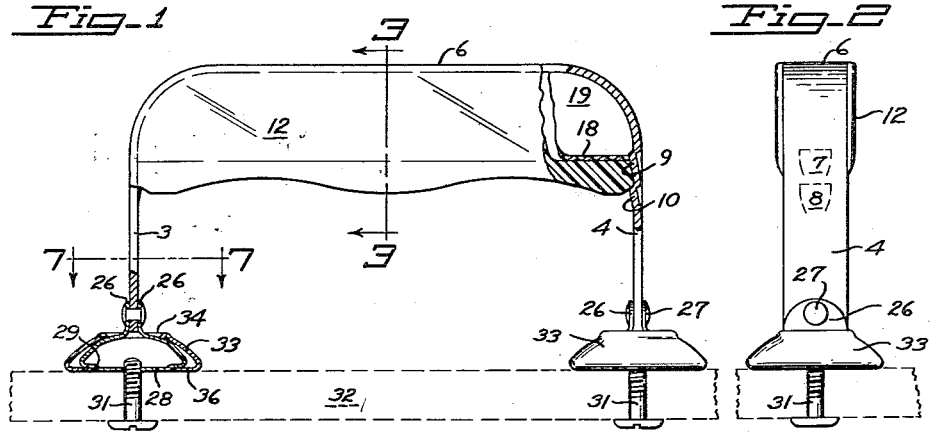
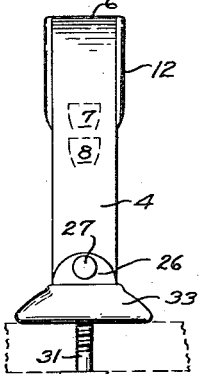
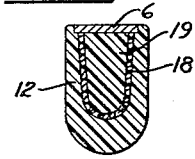
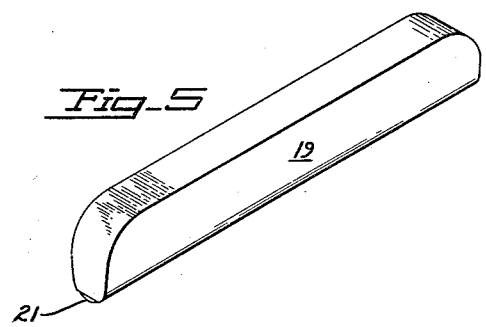
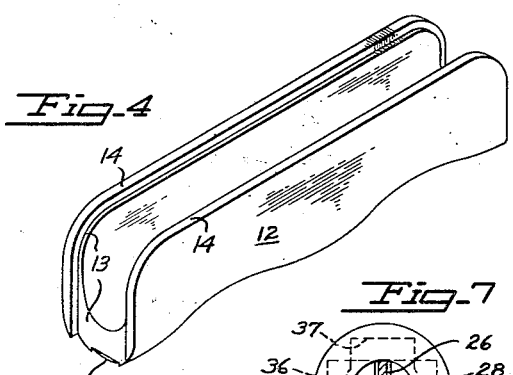
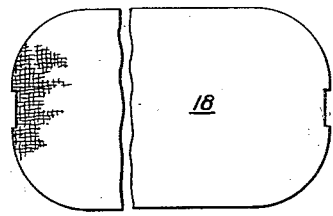
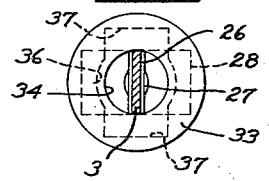
INVENTOR
CLARENCE S. BURTCHAELL
BY Charles S. Evans
his ATTORNEY

United States Patent Office 2,800,984
Patented July 30, 1957

2,800,984

LUGGAGE HANDLE

Clarence S. Burtchaell, Ross, Calif.

Application May 2, 1955, Serial No. 505,288

2 Claims. (Cl. 190—57)

My invention relates to luggage handles comprised of a bail, a hand grip on the bail and fastening means for pivotally connecting the bail to the luggage.

Another object is the provision of improved means for securing the grip to the bail.

Still another object is the provision of a luggage handle of appealing appearance, and made of simple parts quickly assembled and applied.

Other objects will be brought out in the following description of the invention. I do not limit myself to the showing made by said description and the drawings, since I may use variant forms of the invention within the scope of the appended claims.

Referring to the drawings:

Fig. 1 is a side elevation of my luggage handle applied to a piece of luggage, of which only a small part is shown. Portions of the handle are broken away to disclose underlying structure.

Fig. 2 is an end elevation of my handle.

Fig. 3 is a vertical sectional view of the grip part of my handle taken in the plane 3—3 of Fig. 1.

Fig. 4 is a perspective view of the grip 12.

Fig. 5 is a perspective view of the filler 19.

Fig. 6 is a plan of the liner, a portion being omitted to reduce the length of the view.

Fig. 7 is a plan of the dome assembly, the plane in which the view is taken being indicated by the line 7—7 of Fig. 1.

It is usually desirable to mark luggage in some fashion to facilitate identification. Name plates are expensive and tags are easily removed. I have provided a hollow transparent grip in a luggage handle within which a distinctive design or picture or name on a liner sheet may be displayed. The grip is snapped into a resilient bail which spreads open to seat lugs in complementary recesses in the grip, so that the two parts are interlocked rigidly together.

A filler piece fitting within the hollow grip holds the liner sheet in position. Means are also provided for securely fastening the ends of the bail to the luggage; and such means is quickly assembled and applied. If repairs should be necessary or a change in identifying symbols be desired, removal of a single screw, reached from the inside of the luggage, permits the parts to be disassembled for alteration.

My luggage handle is composed of two main elements; the grip shaped and conditioned for the hand; and the fastening device for securing the grip to some convenient part of the luggage. A U-shape bail in inverted position, connects the two elements and is a definite part of each one. The bail is made of a long narrow strip of spring metal with its ends 3 and 4 forming the parallel sides of the U, joining the flat middle or top portion 6 of the U in easy curves as shown.

In each end of the bail small areas 7 and 8 are pressed inwardly to form lugs 9 and 10 respectively. The lugs are not severed in any part from the parent stock; and the shape of the impressed areas is chosen for ornamental value.

A hollow transparent plastic grip 12, Fig. 4, is formed with a ledge 13 just within the flange 14 on each side face of the grip. On or near the lower corner at each end of the block is a recess 16. The ledges 13 and recesses 16 provide a seat complementary to the bail; and because of the resilience of the bail, the two may be pressed together, the lug 10 on the bail engaging snugly in the adjacent recess 16 of the grip, and the bottom and adjacent end portions of the bail lying flush within the flanges 14 of the grip. While this interlocking of bail and grip is readily forced with a free bail, it becomes a rigid and secure connection when the ends of the bail are fastened to the luggage. The lower edge of the grip is preferably curved as shown to present a comfortable shape for the hand of the user.

Before the grip is inserted in the bail, a liner 18, Fig. 6, cut to shape, is placed within the hollow space and held there with a plug or filler 19, Fig. 5. The filler has two main purposes; first to keep the liner pressed smoothly against the inside faces of the grip; and second, to reenforce the hollow grip and assist in transmitting compression stresses applied to the lower edge of the grip by the hand of the user to the bail, from which the luggage hangs.

To best perform its purpose, the filler is formed with a recess 21 at each end, so arranged that they are also engaged by the complementary lugs 9 at the same time that the lugs 10 engage the grip. Thus the three parts are rigidly interlocked within the bail by the simple expedient of pressing matching parts together.

The liner may be of any desired pattern or color in harmony with the surface of the luggage. An attractive handle is formed by making the liner of the same material as that used to cover the luggage case. A liner bearing the name of the owner may also be used, since disassembly of the parts and their reassembly is simple and fast.

Means are provided for fastening each end of the bail to the luggage. An anchor loop of strip metal is shaped as shown in Fig. 1, the two ends 26 of the loop being pivotally connected by the pivot pin or rivet 27 to the end of the bail on opposite sides thereof. The head 28 of the loop is longer than it is wide and provides an offset end 29 on each side of the center link through the pivotal connection. A simple screw 31 threaded into the head of the loop through the luggage wall 32 holds the loop head down tight against the luggage wall.

As a finish and to protect the anchor loop, I surround it with a dome 33 having a circular opening 34 in the top so that it may be assembled over the anchor loop before the latter is connected to the bail. The lower edge of the dome is turned inwardly in a flange 36, interrupted at opposite sides by notches 37. The proportions and sizes of the parts are such that the dome may be fully seated over the anchor loop, the ends 29 passing through the notches 37. Turning the dome 90° then seats the offset ends of the anchor loop upon the flange 36; and tightening the screw 31 clamps the head of the anchor loop and the dome rigidly to the luggage wall.

I claim:

1. A luggage handle comprising a resilient metal strip forming an inverted U-shape bail, fastener means for securing each end of the bail to the luggage, a transparent hollow grip grooved to receive the top and end portions of the bail, the end portions of the bail having inwardly extending lugs and each end of the grip having a complementary recess in which an adjacent lug engages, and a filler within the hollow grip having on each end a recess engaging an adjacent lug on the bail.

2. A luggage handle comprising a resilient metal strip forming an inverted U-shaped bail, fastener means for securing each end of the bail to the luggage, a grip member having a groove in the upper portion thereof receiving top and end portions of the bail, an integral lug projecting inwardly within the bail on each end portion of the bail and engageable with adjacent bottom portions of the grip member to press upwardly against said bottom portions to retain the grip member and bail in assembled relation, said groove in the grip member having an integral support portion to support an adjacent upper portion of said bail when received in said grip member.

References Cited in the file of this patent

UNITED STATES PATENTS

| | | |
|---|---|---|
| 931,698 | Maxwell | Aug. 17, 1909 |
| 2,176,698 | Albrecht | Oct. 17, 1939 |
| 2,176,857 | Hamlin | Oct. 17, 1939 |
| 2,613,771 | Levine | Oct. 14, 1952 |
| 2,678,707 | Finkelstein | May 18, 1954 |